United States Patent
Frey

(10) Patent No.: US 9,080,883 B2
(45) Date of Patent: Jul. 14, 2015

(54) DYNAMIC EMERGENCY AID

(71) Applicant: SIEMENS AKTIENGESELLSCHAFT, München (DE)

(72) Inventor: Christian Frey, Unteraegeri (CH)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/173,505

(22) Filed: Feb. 5, 2014

(65) Prior Publication Data

US 2014/0222329 A1    Aug. 7, 2014

(30) Foreign Application Priority Data

Feb. 5, 2013   (DE) .......................... 10 2013 201 873

(51) Int. Cl.
*G01C 21/20* (2006.01)
*G01C 21/34* (2006.01)
*G08B 7/06* (2006.01)
*G08B 27/00* (2006.01)
*G01C 21/00* (2006.01)

(52) U.S. Cl.
CPC .............. *G01C 21/206* (2013.01); *G08B 7/066* (2013.01); *G08B 27/006* (2013.01); *G01C 21/00* (2013.01); *G01C 21/20* (2013.01); *G01C 21/34* (2013.01)

(58) Field of Classification Search
CPC ............................. H04M 11/00; H04M 11/04
USPC ......... 701/400, 423, 428, 429, 431, 433–437, 701/468, 533; 340/500; 455/404.1, 414.2
See application file for complete search history.

(56) References Cited

U.S. PATENT DOCUMENTS

| | | | |
|---|---|---|---|
| 5,596,652 A * | 1/1997 | Piatek et al. .................. | 382/115 |
| 7,242,303 B2 * | 7/2007 | Patel et al. .................. | 340/572.4 |
| 7,468,658 B2 * | 12/2008 | Bouressa .................. | 340/539.1 |
| 8,401,514 B2 * | 3/2013 | Ebdon et al. .............. | 455/404.1 |
| 2005/0190053 A1 | 9/2005 | Dione | |
| 2006/0208888 A1 * | 9/2006 | Patel et al. .................. | 340/572.1 |
| 2007/0049259 A1 | 3/2007 | Onishi et al. | |
| 2007/0229274 A1 * | 10/2007 | Patel et al. .................. | 340/572.4 |
| 2008/0122609 A1 * | 5/2008 | Mannisto et al. ............. | 340/500 |
| 2009/0138353 A1 * | 5/2009 | Mendelson ..................... | 705/14 |

(Continued)

FOREIGN PATENT DOCUMENTS

| DE | 102011078965 A1 | 5/2012 |
|---|---|---|
| DE | 102013201873 | 2/2013 |

(Continued)

*Primary Examiner* — Thomas Tarcza
*Assistant Examiner* — Tyler J Lee
(74) *Attorney, Agent, or Firm* — Staas & Halsey LLP

(57) ABSTRACT

Dynamic output of information for the evacuation of persons, in particular from buildings, is provided to a portable device based on current position data of the device as determined by a position determination system. The current usability of escape routes located in the building is determined by a sensor system. Evacuation information is determined by a control unit, based on the current usability of the escape routes and the current position of the device and output on the portable device. In emergency situations, dedicated evacuation information can thus be determined for a person as a function of the whereabouts of the person and the respective hazardous situation and output on the mobile device (e.g. smartphone, PDA) of the person. This enables, inter alia, a rapid and efficient evacuation of the building or a site.

19 Claims, 2 Drawing Sheets

(56) References Cited

U.S. PATENT DOCUMENTS

2011/0136463 A1 6/2011 Ebdon et al.
2012/0047083 A1* 2/2012 Qiao et al. .................. 705/325
2013/0183924 A1* 7/2013 Saigh et al. ............... 455/404.2

FOREIGN PATENT DOCUMENTS

| WO | 2009/038563 A1 | 3/2009 |
| WO | 2013/071473 A1 | 5/2013 |
| WO | 2013/107574 A1 | 7/2013 |

* cited by examiner

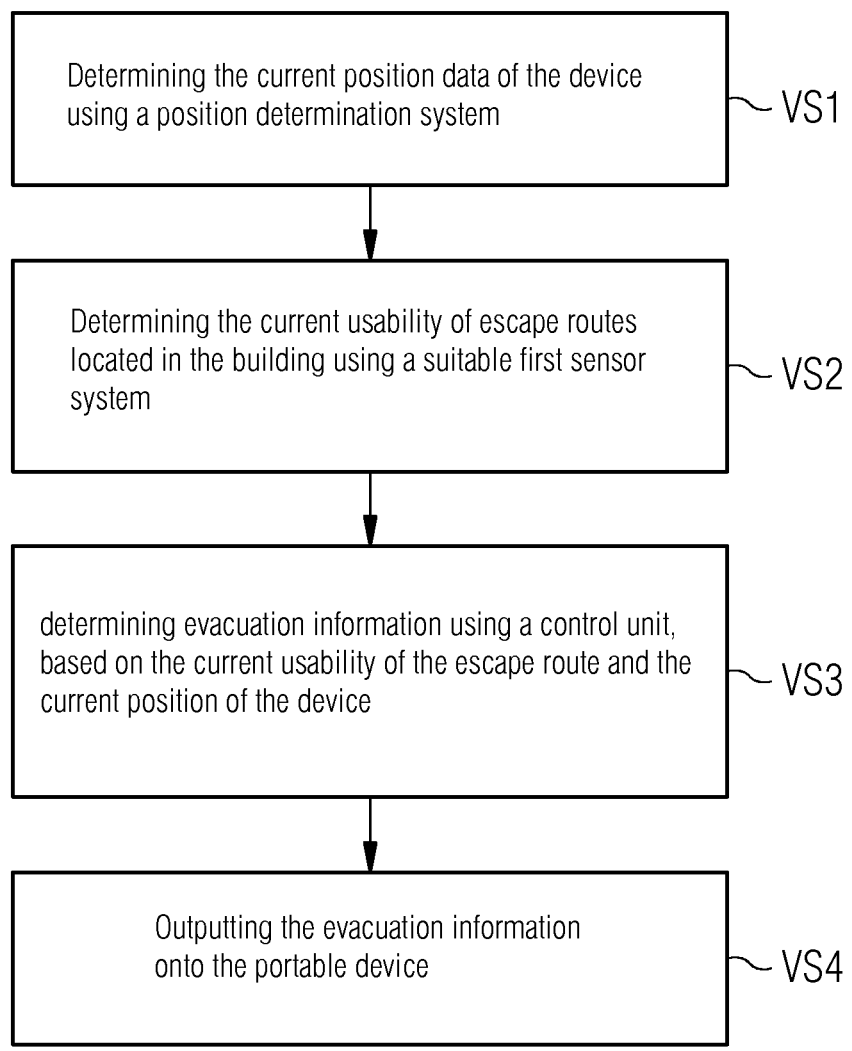

DYNAMIC EMERGENCY AID

CROSS REFERENCE TO RELATED APPLICATIONS

This application claims the benefit of German Application No. 102013201873.8 filed on Feb. 5, 2011, the contents of which are incorporated by reference herein.

BACKGROUND

Described below are a method, a computer program product, and an apparatus for the dynamic output of information for the evacuation of persons, in particular, from buildings, onto a portable device.

The rapid and safe emergency evacuation of persons from buildings but also from open air events (e.g. rock concert) nowadays plays an increasingly larger role, particularly in respect of terror attacks or environmental catastrophes. A rapid and safe emergency evacuation is therefore already an important aspect in the planning of infrastructures, e.g. for buildings or concerts.

Known evacuation systems are however configured statically, like for instance the identification of emergency exits or the guidance to emergency exits located in the building.

SUMMARY

The method, computer program product and apparatus described below provide dynamic output of information for the evacuation of persons from buildings.

The method for the dynamic output of information for the evacuation of persons, in particular from buildings, onto a portable device includes:
- determining the current position data of the device using a position determination system;
- determining the current usability of escape routes located in the building using a suitable first sensor system;
- determining evacuation information using a control unit, based on the current usability of the escape route and the current position of the device; and
- outputting the evacuation information onto the portable device.

Depending on the number of persons in the different building parts, escape routes are heavily or less heavily utilized. Furthermore, escape routes can be blocked by obstacles (e.g. due to fire or smoke) or can only be passed through with difficulty. The vacation of a building nevertheless takes place more quickly if the persons are directed dynamically (depending on utilization or availability) to open and passable escape routes. The current usability of escape routes can be monitored and determined for instance using cameras already disposed in the building. The evacuation information is advantageously output onto portable devices, which are already in the possession of users (like for instance smartphones, portable media players (PMP) or also tablet PCs). The evacuation information can in principle also be output onto portable devices, which a user (visitor) only receives upon entry into the building (e.g. an electronic museum guide or a so-called multimedia guide). The portable device is advantageously equipped with a position determination system (e.g. GPS system), which can be used to determine the position of the device. It is however also possible for the current position data of the device to be determined by a separate position determination system, e.g. an indoor positioning system, IPS, located inside the building. An IPS can in principle also be installed in open spaces. An IPS can be realized for instance by correspondingly arranged local radio cells, such as WLAN nodes, hot spots, access points etc. The method enables in particular the provision of dedicated evacuation information in accordance with the current localization and situation of the respective persons.

A first advantageous embodiment provides determination of the current usability of escape routes being based on the respective utilization and/or passability thereof. Depending on the number of persons in the different building parts, escape routes are heavily or less heavily utilized. Furthermore, escape routes can be blocked by obstacles (e.g. due to fire or smoke) or can only be passed through with difficulty. Suitable sensors (e.g. cameras and/or smoke/gas detectors) are positioned in the escape routes (e.g. staircases). These sensors detect noise, number of persons (utilization) for instance. The utilization or usability (escape route impeded by smoke) of an escape route can be determined as a result. The evacuation of a building nevertheless takes place more quickly if the persons are directed dynamically (depending on utilization or availability) to open and passable escape routes. The current position of the device is also an indication of the current position of the device owner. As a result, dedicated evacuation information (i.e. subject to location and the prevailing hazardous situation) can be output to each person respectively on the portable device.

With the evacuation of persons from buildings, the method allows account to be taken, inter alia, of the current utilization and current passability of escape routes, and of the location of a person needing to be rescued. Currently prevailing bottlenecks but also expected bottlenecks are thus identified and taken into account in the evacuation process. This enables situations such as panic situations to be prevented in the evacuation process.

A further advantageous embodiment includes a building plan of the building being loaded onto the device and the evacuation information, as routing information, on the building plan being output graphically on the device. The building plan can be generated for instance from a building information model (BIM) and loaded onto the portable device, e.g. via a WLAN connection upon entry into a building. If the portable (mobile) device is a device which is handed to a person upon entry into a building (e.g. multimedia guide in a museum), then this device is advantageously already equipped with the corresponding building plan. The mobile device can display the escape route data (evacuation data) in a similar manner to commercially-available navigation systems in a 2D/3D graphics (map). It is nevertheless also possible to display the evacuation data, e.g. in camera live view mode (or live preview mode), such as in known in digital cameras. The evacuation information on the building plan can be displayed for instance by information overlay (image and/or text information) using overlay technology, (e.g. by direct hardware overlay or also by software overlay).

A further advantageous embodiment includes the building plan of the building being loaded onto the device via the Internet or by the reading-in of an identifier located on the building using a suitable read apparatus of the device. The building plan can be loaded onto the mobile device by a service provider via the Internet. The user registers with the service provider, who functions as a content provider and can inter alia provide the building plans. A building or site plan can be downloaded for instance on demand from a user. It is however also possible for the building or site plan to be downloaded by a push service (push technology). To this end, the user registers with an Internet service provider, by way of which the GPS system of the mobile device identifies to the service provider that the user is located in a specific building (e.g. town hall, stadium), the service provider then automatically loads the building or site plan onto the mobile device (e.g. smartphone). It is nevertheless also possible, by reading-in an identifier located on the building using a suitable read apparatus of the device, to load the building plan onto the mobile device. E.g. by reading-in a QR code, which is located on the building (e.g. as additional information on the emergency path/emergency exit information signs).

A further advantageous embodiment includes an object flow simulation being implemented based on the respective current position data of the persons located in the building and the current usability of the escape routes, and wherein, based on the results of the object flow simulation, updated evacuation information is output respectively on the portable device. The expected movement of persons is reproduced as realistically as possible by an object flow simulation, in order therefrom to be able to derive statements with regard to the evacuation of persons from buildings for instance. As a result of the position information of persons and the availability of escape routes being used as input parameters for an object flow simulation, a dedicated escape route can be calculated for each person in a dedicated manner. E.g. the quickest route of a person from his current location to the next passable emergency exit. As a result, an effective evacuation of a predetermined area or building can take place. The object flow simulation can be implemented on a commercially-available computer (e.g. server, laptop, PC) with suitable simulation software. The object flow simulation can take place for instance on a computer of a building management system or in a cloud (cloud computing). With the object flow simulation, the emission propagation of a hazardous source (e.g. fire or flue gas) in the building or on the site can optionally also be taken into account. The generation and provision of precise and targeted evacuation is as a result also possible. Furthermore, with object flow simulation the directions of movement of the persons located in the building (on the site) can optionally also be taken into account. The direction of movement can be determined for instance by cameras or other suitable sensor systems.

A further advantageous embodiment is a computer program product, loaded directly into the internal memory of a portable device, in particular a smartphone or a tablet computer, and includes software sections, with which the method can be executed for the dynamic output of information for the evacuation of persons. The computer program product contains executable program code, which is executed on a processor of the portable device. The computer program product can be loaded onto the portable device as a software program, e.g. by way of a USB interface or by way of a wireless radio link. The computer program product can optionally also be implemented as firmware on the portable device (e.g. in a flash memory or an EPROM). As a result of the computer program product being disposed on the portable device of the user (e.g. person in the building), person-specific evacuation information, in particular in respect of identity and location, can be very easily provided for the respective person on the device. This facilitates rescue teams for instance in rapidly locating the person in the building.

In a further advantageous embodiment, the computer program product is a software program (app) which can be downloaded by the user from the Internet or Intranet. A user can thus load the computer program product (e.g. a software program) as a so-called app (mobile app) onto his portable device on demand. The app can be obtained on request by the user from a service provider for instance via its Internet market place (such as e.g. app Store™, Google PIay™) by downloading from the Internet. It is however also possible for the app to be offered to the user for downloading onto his portable device upon entry into a building or site.

The apparatus for dynamic output of information for the evacuation of persons, in particular from buildings, onto a portable device of a respective person includes:
- a suitable first sensor system for determining the current usability of the respective escape routes located in the building
- a position determination system for determining the positions of persons located in the building;
- a control unit (SE) for real-time processing of data provided by the first sensor system and the position determination system; wherein evacuation information is provided on the portable device of the dedicated person by the control unit based on the current usability of the escape routes and the current position of a dedicated person.

The apparatus can be easily realized or retrofitted in an existing building or site, they are usually already present in the building or present with a user or obtainable on the open market. Cameras can be used for instance as a suitable first sensor system for determining the current usability of the respective escape routes located in the building, the cameras already being located in the building or able to be easily retrofitted at corresponding locations (e.g. in staircases or beyond emergency exit doors). A GPS system of the portable device (smartphones are nowadays already equipped with a GPS system or a GPS system can be retrofitted on a smartphone by way of an app), can be used as the position determination system. It is however also possible to use an indoor position determination system (e.g. based on radio cells located in the building, based on RFID technology or through Near Field Communication (NFC)). The control unit (e.g. a commercially-available computer such as a server, PC or laptop) for the real-time processing of data provided by the first sensor system and the position determination system is equipped with corresponding software (communication software for communication with the portable device, simulation software or decision tables for the provision of evacuation information based on the current situation in the building etc.). The evacuation information is output onto output media (display, loudspeaker) of the portable device optically (graphic and/or text form) and/or acoustically (e.g. in the form of operating instructions).

In order to realize an indoor position determination system, the geographic position of the radio cells arranged in the building (WLAN nodes, hot spots, access points etc.) can be stored in the form of a table. The positions of the radio cells are advantageously stored in the building plan. The current position in the building can thus be determined by the mobile device on the basis of the triangulation principle.

In a further advantageous embodiment, the apparatus includes provision of the building plan of the building on the portable device, wherein the portable device is suited to graphically representing the evacuation information as routing information on the building plan. The building plan can be read in for instance by reading in a corresponding QR code or bar code, which can be attached at the entrance or on an emergency exit sign of the corresponding building, by a corresponding scan app (e.g., ScanLife™) on the portable device. The mobile (portable) device can display the evacuation data in a similar manner to commercially-available navigation systems in a 2D/3D graphics (map). It is however also possible to display the evacuation data, e.g. in camera live view mode (or live preview mode), such as in known in digital cameras, on the device. The evacuation information on the building plan can be displayed for instance by information overlay (image and/or text information) using overlay technology, (e.g. by direct hardware overlay or also by software overlay). Commercially-available mobile devices, such as for instance smartphones or table computers, are nowadays usually equipped for these display possibilities or can be upgraded accordingly.

A further advantageous embodiment has the apparatus being a part of a building management and/or hazard alarm system. Static (plans) and dynamic data (e.g. room occupations in a hotel) are present or are centrally accessible in a building management or hazard alarm system. In the event of danger (e.g. fire), suitable rescue measures can be coordinated or initiated for individual persons in a targeted fashion by the integration into a building management system or hazard alarm system.

BRIEF DESCRIPTION OF THE DRAWINGS

These and other aspects and advantages will become more apparent and more readily appreciated from the following description of the exemplary embodiment, taken in conjunction with the accompanying drawings of which:

FIG. 2 is an exemplary flowchart of a method.

DETAILED DESCRIPTION OF THE PREFERRED EMBODIMENT

Figure 1:
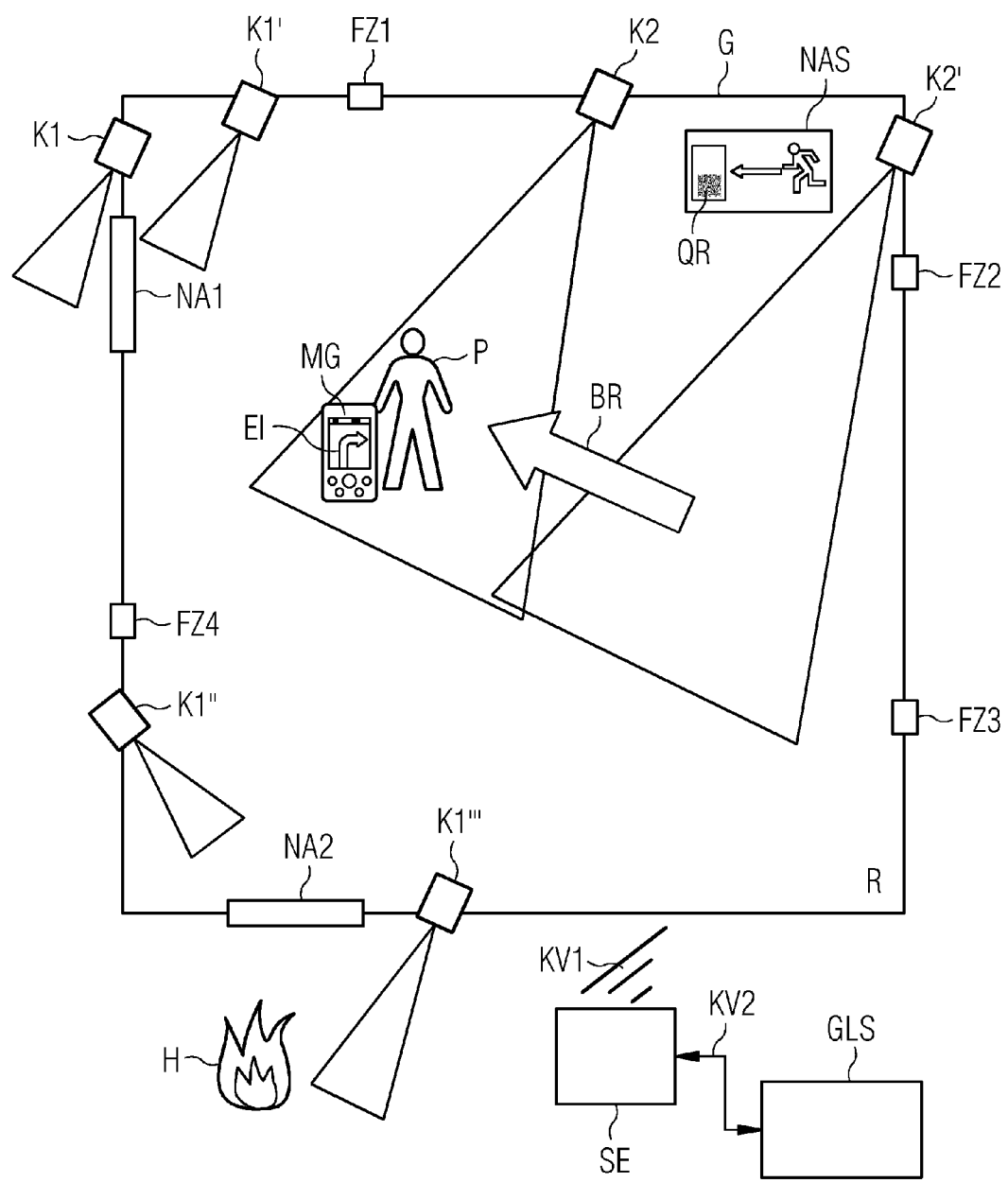
FIG. 1 is an exemplary basic block diagram.

Reference will now be made in detail to the preferred embodiments, examples of which are illustrated in the accompanying drawings, wherein like reference numerals refer to like elements throughout.

A building, a ship or a site is currently evacuated in accordance with acoustic and/or optical alarms. The affected persons must then seek out the path to the nearest emergency exit with the aid of a static escape route identifier (e.g. green information signs for emergency exits). In unfamiliar buildings with restricted visibility, this is often difficult for an affected person. The escape route may also be impassable via the staircase due to significant smoke emission. Static escape route identifies do not take into account such situations.

FIG. 1 shows an exemplary basic block diagram. A person P is located in an area R of a building G. The area may be a room for instance, a floor, a staircase, a balcony but in principle also an outer area of a building G. In the case of an emergency (i.e. fire, terror alarm), persons located in the building G are to be evacuated safely and rapidly. Nowadays buildings (e.g. in particular public buildings) are provided with emergency exits NA1, NA2 and signposts to emergency exits, in order to indicate to persons P a way out of the building H in an emergency. The known static emergency exit systems however do not ensure that the path beyond an emergency exit door NA1, NA2 also actually represents an escape route out of the building G, since the escape route beyond one of the emergency exit doors NA1, N2 could be blocked.

The apparatus conversely allows for a dynamic output of information EI for the evacuation of persons P from buildings G (in principle the apparatus is not restricted to the evacuation of persons from buildings, but can also be used for the evacuation of ships or other events such as for instance rock concerts). According to the representation in FIG. 1, the apparatus includes a suitable first sensor system K1, K1', K1", K1''' for determining the current usability of the respective escape routes NA1, NA2 located in the building. Cameras can be used for instance as a suitable first sensor system K1, K1', K1", K1'''. Alternatively or optionally, the sensor system K1, K1', K1", K1''' can also represent fire or smoke/gas detectors, or a combination of different sensor types. A suitable sensor system can be selected on site depending on the prevailing requirements or conditions.

In FIG. 1, the cameras K1 and K1' monitor the emergency exit NA1, the cameras K1" and K1''' monitor the emergency exit NA2. In FIG. 1 the camera K''' identifies that an obstacle H in the form of a fire is located beyond the emergency exit NA2. An escape route through emergency exit NA2 would thus not be passable. This information that based on area R, an escape route via emergency exit NA2 cannot be used for a person P located in the area R, is provided to the control unit SE from the camera K''' in real-time via a communication link KV1 (e.g. advantageously a radio link). The control unit SE (e.g. PC, Laptop, Workstation) determines, based on the building plan and the data provided by the first sensor system K1, K1', K1", K1''' with respect to the usability or passability of emergency exits NA1, NA2, evacuation information EI for persons P located in the building G.

The control unit SE transfers the evacuation information EI via the communication link KV1 to the mobile device MG of a person located in the building G. A mobile device MG can be a smartphone, cell phone, PDA (Personal Digital Assistant), notebook or a tablet computer. The evacuation information EI is advantageously output graphically in an animated fashion on the display of the mobile device MG. Optionally the evacuation information EI can however also be output using text and/or acoustically (e.g. in the form of operating instructions) on the mobile device MG.

The apparatus further includes determining the current position data of the person P located in the building G. This can be done for instance by a suitable second sensor system K2, K2'. The second sensor system K2, K2' can be realized for instance by cameras, which detect the respective whereabouts and directions of movement BR of persons P. The position data of the persons P located in the building G can however also be determined by an indoor position determination system located in the building based on radio cells FZ1 to FZ4 located in the building and can be forwarded to the control unit SE, advantageously by way of a wireless communication link. It is in principle also possible to use the GPS system of the mobile device MG for the position determination of a person P.

By taking into account the current position data of the persons P located in the building G and the current escape route situation (which escape route can be used?; which escape route is impassable?), dedicated escape route information EI can be determined for each person P and output on the respective mobile device MG. An ordered and coordinated evacuation can further take place, since, in the case of evacuation, bottlenecks or overload situations in escape routes can be prevented by the output of targeted evacuation information EI to the persons P.

The apparatus advantageously includes the provision of the building plan of the building on the portable device MG, wherein the portable device MG is suited to graphically representing the evacuation information as routing information on the building plan. The building plan can be read in for instance by reading in a corresponding QR code or barcode, which can be attached at the entrance or on an emergency exit sign NAS of the corresponding building G for instance, by a corresponding scan app (e.g., ScanLife™) on the portable device MG. The mobile (portable) device MG can display the evacuation data in a similar manner to commercially-available navigation systems in a 2D/3D graphics (map) for instance. It is however also possible to display the evacuation data EI, e.g. in camera live view mode (or live preview mode), such as is known in digital cameras, on the device. The evacuation information EI on the building plan can be displayed for instance by information overlay (image and/or text information) using overlay technology, (e.g. by direct hardware overlay or also by software overlay). The reading-in of the building plan by a suitable identifier on the mobile device MG in the building G can be provided to the building plan on demand.

An object flow simulation is advantageously implemented by the control unit SE, based on the respective current position data of the persons located in the building G and the current usability of the escape routes NA1, NA2, and wherein, based on the results of the object flow simulation, updated and dedicated evacuation information EI is provided on the mobile devices MG. The expected movement of persons P is reproduced as realistically as possible by an object flow simulation based on an underlying movement model. As a result, an effective evacuation of the building G or a site can take place.

The emission propagation of a hazard source H (e.g. a fire) in the building G is advantageously also used for the object flow simulation. The emissions include for instance heat emissions or pollutant emissions or smoke emissions, which are produced by an emission source or a fire source. The emissions can influence a person flow by direct contact, for instance by persons P being injured by the emission or can influence the considered person flow indirectly, since they change or influence the travel speed of the persons P. An effective evacuation of the building G also takes place. The calculation of the object flow simulation can take place for instance on a commercially-available PC with corresponding software.

The mobile device MG contains software for communication with the control unit SE, and for reading in, processing and displaying the building plan with the corresponding evacuation instructions EI. The software is advantageously a computer program product, which can be loaded directly into the internal memory of a portable device MG, in particular a smartphone or a tablet computer, and includes software sections, with which the method can be executed for the dynamic output of information for the evacuation of persons. The computer program product contains an executable program code, which is executed on a processor of the portable device. The computer program product can be loaded onto the portable device as a software program, e.g. by way of a USB interface or by way of a wireless radio link. The computer program product is advantageously downloadable from the Internet onto the mobile device MG as a so-called app ("Rescue app"). It is however also possible, upon entry into a building G, for a person P to be automatically referred to a download of the app by corresponding information on the mobile device MG and requested to perform the download.

The control unit SE is advantageously integrated in a building management system GLS or coupled to a building management system GLS via a suitable communication link KV2. In a building management system GLS, all relevant information relating to a building is known and/or stored electronically in corresponding building management software (GLT) (e.g. the information as to whether an escape route is accessible with a wheelchair). The control unit SE can access this information (e.g. using database access) and use it for the calculation and provision of evacuation information EI. It is therefore possible for instance for the wheelchair user to be able to be guided by the evacuation information EI to a safe location in the building G, so as to wait there for the rescue team. The control unit SE is equipped with corresponding processor and storage capacity.

FIG. 2 shows an exemplary flowchart of a method for the dynamic output of information EI for the evacuation of persons P, in particular from buildings G, onto a portable device MG by
    determining the current position data of the device using a position determination system (VS1);
    determining the current usability of escape routes located in the building G using a suitable first sensor system (VS2);
    determining evacuation information using a control unit SE, based on the current usability of the escape routes NA1, NA2 and the current position of the device MG; and (VS3); and
    outputting the evacuation information EI on the portable device MG (VS4).

The determination of the current usability of escape routes is based in particular on their respective utilization and/or their passability.

The method optionally includes:
    loading a building plan of the building onto the mobile device.
    outputting the evacuation information as graphical routing information on the building plan on the display of the device.

The building plan is loaded onto the device in particular via the Internet (by a corresponding download by a service provider) or by the reading-in of an identifier located on the building (e.g. in the form of QR code or barcode) by a suitable read facility of the device (e.g. by a scan app).
    Implementing an object flow simulation by the control unit SE, based on the current position data of the persons P located in the building G and the current usability of the escape routes, wherein based on the results of the object flow simulation, updated evacuation information EI is provided in each instance on the mobile device MG.

The method is realized by communication of the corresponding software of the mobile device MG with the control unit SE. It is however also possible for the mobile device MG only to function as an output medium of the evacuation information provided by the control unit SE.

The method offers in particular the following ad-vantages:
    improved orientation within the building, in particular for persons who are entering a building for the first time.
    dynamic escape route calculation in order to "avoid" possible hazardous areas.
    transferring your position to rescue forces if self-rescue is not possible.
    current building data can be transmitted via QR scan to the mobile device (e.g. smartphone) for instance.
    outputting dedicated evacuation information based on the current position of a person and the currently prevailing hazardous situation.

Method and apparatus provide for the dynamic output of information for the evacuation of persons, in particular from buildings, onto a portable device, wherein the current position data of the device is determined by a position determination system, wherein the current usability of escape routes located in the building is determined by a suitable first sensor system, wherein evacuation information is determined by a control unit, based on the current usability of the escape routes and the current position of the device, and wherein the evacuation information is output on the portable device of the person. In emergency situations, dedicated evacuation information can thus be determined for a person as a function of the whereabouts of the person and the respective hazardous situation and output on the mobile device (e.g. smartphone, PDA) of the person. This enables, inter alia, a rapid and efficient evacuation of the building or a site.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A method for dynamic output of information, for evacuation of persons from a building, onto a portable device, the method comprising:
   determining current position data of the portable device using a position determination system;
   determining current usability of escape routes located in the building using a first sensor system;
   determining evacuation information using a hardware control unit, based on the current usability of the escape routes and the current position of the portable device;
   reading in an identifier located on the building by a read facility of the portable device; and
   outputting the evacuation information on the portable device as graphical routing information on a building plan loaded onto the portable device by the reading.

2. The method as claimed in claim 1, wherein said determining of the current usability of the escape routes is based on at least one of respective utilization and passability.

3. The method as claimed in claim 2, further comprising targeting the evacuation information to the persons in coordinating evacuation of the building.

4. The method as claimed in claim 3,
   further comprising implementing an object flow simulation based on respective current position data of the persons located in the building and the current usability of the escape routes, and
   wherein, based on results of the object flow simulation, said outputting includes updated evacuation information output onto the portable device.

5. The method as claimed in claim 2,
   further comprising implementing an object flow simulation based on respective current position data of the persons located in the building and the current usability of the escape routes, and
   wherein, based on results of the object flow simulation, said outputting includes updated evacuation information output onto the portable device.

6. The method as claimed in claim 2, further comprising targeting the evacuation information to the persons in coordinating evacuation of the building.

7. The method as claimed in claim 1,
   further comprising implementing an object flow simulation based on respective current position data of the persons located in the building and the current usability of the escape routes, and
   wherein, based on results of the object flow simulation, said outputting includes updated evacuation information output onto the portable device.

8. A non-transitory computer readable medium embodying a computer program which when loaded directly into internal memory of a portable device causes the portable device to execute a method for dynamic output of information to evacuate persons from a building, the method comprising:
   determining current position data of the portable device using a position determination system;
   determining current usability of escape routes located in the building using a first sensor system;
   determining evacuation information using a hardware control unit, based on the current usability of the escape routes and the current position of the portable device;
   reading in an identifier located on the building by a read facility of the portable device; and
   outputting the evacuation information on the portable device as graphical routing information on a building plan loaded onto the portable device by the reading.

9. The non-transitory computer readable medium as claimed in claim 8, wherein the portable device is a smartphone and the computer program is downloaded by a user from an Internet or Intranet.

10. The non-transitory computer readable medium as claimed in claim 8, wherein said determining of the current usability of the escape routes is based on at least one of respective utilization and passability.

11. The non-transitory computer readable medium as claimed in claim 10, further comprising targeting the evacuation information to the persons in coordinating evacuation of the building.

12. The non-transitory computer readable medium as claimed in claim 11,
   further comprising implementing an object flow simulation based on respective current position data of the persons located in the building and the current usability of the escape routes, and
   wherein, based on results of the object flow simulation, said outputting includes updated evacuation information output onto the portable device.

13. The non-transitory computer readable medium as claimed in claim 10,
   further comprising implementing an object flow simulation based on respective current position data of the persons located in the building and the current usability of the escape routes, and
   wherein, based on results of the object flow simulation, said outputting includes updated evacuation information output onto the portable device.

14. The non-transitory computer readable medium as claimed in claim 8, further comprising targeting the evacuation information to the persons in coordinating evacuation of the building.

15. The non-transitory computer readable medium as claimed in claim 8,
   further comprising implementing an object flow simulation based on respective current position data of the persons located in the building and the current usability of the escape routes, and
   wherein, based on results of the object flow simulation, said outputting includes updated evacuation information output onto the portable device.

16. An apparatus for dynamic output of information, for evacuation of persons from a building, onto a portable device of a respective person, comprising:
   a first sensor system determining current usability of escape routes located in the building;
   a position determination system determining positions of persons located in the building;
   a hardware control unit, coupled to said first sensor system and said position determination system,
      performing real-time processing of data provided by the first sensor system and the position determination system;
      sending to the mobile device, which has a read apparatus for reading in an identifier located on the building, a building plan of the building; and providing graphic evacuation information to the portable device of a person as routing information on the building plan based on the current usability of the escape routes and a current position of the person.

17. The apparatus as claimed in claim 16, wherein the hardware control unit is configured to implement an object flow simulation based on respective current position data of the persons located in the building and the current usability of the escape routes and provide, based on results of the object flow simulation, updated evacuation information on portable devices of the persons.

18. The apparatus as claimed in claim 17, wherein the apparatus is part of a building management and/or hazard alarm system.

19. The apparatus as claimed in claim 16, wherein the apparatus is part of a building management and/or hazard alarm system.

\* \* \* \* \*

UNITED STATES PATENT AND TRADEMARK OFFICE
CERTIFICATE OF CORRECTION

Page 1 of 1

PATENT NO.        : 9,080,883 B2
APPLICATION NO.   : 14/173505
DATED             : July 14, 2015
INVENTOR(S)       : Christian Frey It is certified that error appears in the above-identified patent and that said Letters Patent is hereby corrected as shown below:

Specification

Column 1, Line 7

Delete "Feb. 5, 2011," and insert --Feb. 5, 2013,--, therefor.

Signed and Sealed this
Twenty-fourth Day of November, 2015

Michelle K. Lee
*Director of the United States Patent and Trademark Office*